US012810479B2

(12) United States Patent
Barish et al.

(10) Patent No.: US 12,810,479 B2
(45) Date of Patent: Nov. 24, 2026

(54) OPTIMIZED FRAME SEQUENCES FOR FAST DECODE ON DUAL SENSOR SCAN SYSTEMS

(71) Applicant: Zebra Technologies Corporation, Lincolnshire, IL (US)

(72) Inventors: Justin F. Barish, Kings Park, NY (US); Harry E. Kuchenbrod, Kings Park, NY (US); Thomas L. Pyle, Centerreach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 189 days.

(21) Appl. No.: 18/934,292

(22) Filed: Nov. 1, 2024

(65) Prior Publication Data

US 2026/0127767 A1 May 7, 2026

(51) Int. Cl.
*G06T 9/00* (2006.01)

(52) U.S. Cl.
CPC .................................... *G06T 9/00* (2013.01)

(58) Field of Classification Search
CPC ....................................................... G06T 9/00
USPC ......................................................... 382/232
See application file for complete search history.

(56) References Cited

U.S. PATENT DOCUMENTS

2011/0089245 A1* 4/2011 Havens .............. G06K 7/10831 359/666
2014/0183264 A1* 7/2014 Nunnink ............ G06K 7/10831 235/462.24
2018/0033256 A1* 2/2018 Hamidat .............. G06K 7/1447
2019/0311167 A1* 10/2019 Powell ................ G06K 7/1408

* cited by examiner

*Primary Examiner* — Charlotte M Baker

(57) ABSTRACT

A method and system for decoding encoded data appearing within a field of view (FOV) of an indicia reader. The method includes obtaining, via an imaging assembly, a first image and a second of the FOV of an environment. The first and second images are passed to a decoder and the decoder attempts a first decode operation on the first image and a second decode operation on the second image, the first and second decode operations having a first decode timeout time. Responsive to performing a successful decode operation from one of the first and second images, a decode payload is determined and transmitted to a host, or, responsive to performing unsuccessful decode operations on the first and second imaged, the method further includes performing additional decode operations having a second decode timeout time, with the second decode timeout time being longer than the first decode timeout time.

20 Claims, 6 Drawing Sheets

OPTIMIZED FRAME SEQUENCES FOR FAST DECODE ON DUAL SENSOR SCAN SYSTEMS

BACKGROUND

Industrial scanners and/or barcode readers may be used in warehouse environments, in point of sale systems, and/or other environments and may be provided in the form of fixed, mountable, or mobile scanning devices, for example. These scanners may be used to scan barcodes and other objects. Scanners are frequently used in environments that involve scanning or resolving barcodes across a range of distances or in a variety of environmental and lighting conditions. In any such application, a primary objective for performing decoding of indicia is to perform efficient decoding at fast rates or short decode times. To provide for multiple fields of view, or broader imaging working distance ranges, some systems implement multiple cameras, each having different scanning ranges.

Obtained images may require significant processing resources and time to perform image processing, and for performing machine vision processes or indicia detection and decoding. Additionally, some images may be obtained that do not include indicia or target objects, that are too blurry, or otherwise are not useful for decoding indicia or performing machine vision processes. Such images typically are further processed and time and processing resources are wasted attempting to identify and decode indicia in the images. Such operations reduce the overall efficiency of imaging and barcode readers, and may further delay future scans and barcode readings. These useless images further create a bottleneck for systems that employ multiple imagers by using resources that might be better used to analyze and process additional images obtained by the system. The result in such systems is long, undesirable image processing and decode times, which, may not even result in a successful decode operation.

Accordingly, there is a need for improved designs having improved functionalities.

SUMMARY

In accordance with a first embodiment, the present invention is a method for decoding encoded data appearing within a field of view (FOV) of an indicia reader. The method includes obtaining, via an imaging assembly, a first image of the FOV of an environment, the first image obtained with the imaging assembly having a focus at a first focal plane distance; obtaining, via the imaging assembly, a second image of the FOV of the environment, the second image obtained with the imaging assembly having a focus at a second focal plane distance; passing the first image to a decoder and attempting, by the decoder, a first decode operation on the first image to determine a payload, the first decode operation having a first decode timeout time; passing the second image to the decoder and attempting, by the decoder, a second decode operation on the second image to determine a payload, the second decode operation having the first decode timeout time; responsive to performing a successful decode operation from one of the first and second images, transmitting a decoded payload to a host, or responsive to performing unsuccessful decode operations on the first image and second image further performing additional decode operations having a second decode timeout time, with the second decode timeout time being longer than the first decode timeout time.

In a variation of the current embodiment, responsive to performing unsuccessful decode operations of the first image and second image the method further includes obtaining, via the imaging assembly, a third image of the FOV of the environment, the third image obtained with the imaging assembly having a focus at the first focal distance; obtaining, via the imaging assembly, a fourth image of the FOV of the environment, the fourth image obtained with the imaging assembly having a focus as the second focal distance; passing the third image to the decoder and attempting, by the decoder, a third decode operation on the third image to determine a payload, the third decode operation having the second decode timeout time; passing the fourth image to the decoder and attempting, by the decoder, a fourth decode operation on the fourth image to determine a payload, the fourth decode operation having the second decode timeout time; and responsive to performing a successful decode operation from one of the third and fourth images, transmitting a decoded payload to a host, or responsive to performing unsuccessful decode operations on the third image and fourth image, further tuning one or more parameters of the indicia reader, obtaining, by the imaging assembly, one or more additional images, and performing additional decode operations on the one or more additional images. In variations, tuning the one or more parameters of the indicia reader may include performing at least one of a focus ramping, a focus dither, and a focus bracket on one or more imagers of the imaging assembly. In more variations, tuning one or more parameters of the indicia reader comprises tuning one or more of an illumination brightness, image sensor gain, an image capture frame rate, and exposure or exposure time.

In more variations of the current embodiment, at least one of the first and second timeout times is dependent on a frame rate of a respective imaging sensor of the imaging assembly.

In continued variations of the current embodiment, responsive to performing unsuccessful decode operations on the first image and second image, the method further includes tuning one or more parameters of the system before performing the one or more additional decode operations.

In yet more variations of the current embodiment, the first image is obtained via a first imaging sensor of the imaging assembly, the first imaging sensor having a fixed focal distance. In continued variations of the current embodiment, the second image is obtained via a second imaging sensor of the imaging assembly, the second imaging sensor being a variable focus imaging sensor. In even more variations of the current embodiment, the method further includes performing, via an aiming assembly, a ranging measurement and tuning, based on the ranging measurement, the focus of the second imaging sensor. In additional variations of the current embodiment, the method further includes performing an autotune of one or more imaging sensors of the imaging assembly.

In another embodiment, the present invention is a data capture device including an imaging assembly having (i) a first imaging sensor configured to capture images of a field of view (FOV), and at a first focal distance, of the imaging assembly, and (ii) a second imaging sensor configured to capture images of the FOV, at a second focal distance, of the imaging assembly; one or more processors and machine readable instructions that when executed by the one or more processors cause the device to: obtain, via an imaging assembly, a first image of the FOV of an environment, the first image obtained with the imaging assembly having a focus at a first focal plane distance; obtain, via the imaging assembly, a second image of the FOV of the environment, the second image obtained with the imaging assembly having a focus at a second focal plane distance; pass the first image to a decoder and attempting, by the decoder, a first decode operation on the first image to determine a payload, the first decode operation having a first decode timeout time; pass the second image to the decoder and attempt, by the decoder, a second decode operation on the second image to determine a payload, the second decode operation having the first decode timeout time; and responsive to performing a successful decode operation from one of the first and second images, transmit a decoded payload to a host, or responsive to performing unsuccessful decode operations on the first image and second image further perform additional decode operations having a second decode timeout time, with the second decode timeout time being longer than the first decode timeout time.

In a variation of the current embodiment, responsive to performing unsuccessful decode operations of the first image and second image the machine-readable instructions further cause the device to obtain, via the imaging assembly, a third image of the FOV of the environment, the third image obtained with the imaging assembly having a focus at the first focal distance; obtain, via the imaging assembly, a fourth image of the FOV of the environment, the fourth image obtained with the imaging assembly having a focus as the second focal distance; pass the third image to the decoder and attempt, by the decoder, a third decode operation on the third image to determine a payload, the third decode operation having the second decode timeout time; pass the fourth image to the decoder and attempt, by the decoder, a fourth decode operation on the fourth image to determine a payload, the fourth decode operation having the second decode timeout time; and responsive to performing a successful decode operation from one of the third and fourth images, transmit a decoded payload to a host, or responsive to performing unsuccessful decode operations on the third image and fourth image, further tune one or more parameters of the data capture device, obtaining, by the imaging assembly, one or more additional images, and performing additional decode operations on the one or more additional images. In variations, to tune the one or more parameters of the device, the machine readable instructions cause the device to perform at least one of a focus ramping, a focus dither, and a focus bracket on one or more imagers of the imaging assembly. In more variations, to tune the one or more parameters of the device, the machine readable instructions cause the device to tune one or more of an illumination brightness, image sensor gain, an image capture frame rate, and exposure or exposure time.

In more variations of the current embodiment, at least one of the first and second timeout times is dependent on a frame rate of a respective imaging sensor of the imaging assembly.

In continued variations of the current embodiment, responsive to performing unsuccessful decode operations on the first image and second image, the machine readable instructions further cause the device to tune one or more parameters of the device before performing the one or more additional decode operations.

In yet more variations of the current embodiment, the first image is obtained via a first imaging sensor of the imaging assembly, the first imaging sensor having a fixed focal distance. In continued variations of the current embodiment, the second image is obtained via a second imaging sensor of the imaging assembly, the second imaging sensor being a variable focus imaging sensor. In even more variations of the current embodiment, the wherein the machine readable instructions further cause the device to perform, via an aiming assembly, a ranging measurement and tuning, based on the ranging measurement, the focus of the second imaging sensor. In additional variations of the current embodiment, the machine readable instructions further cause the device to perform autotune of one or more imaging sensors of the imaging assembly.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
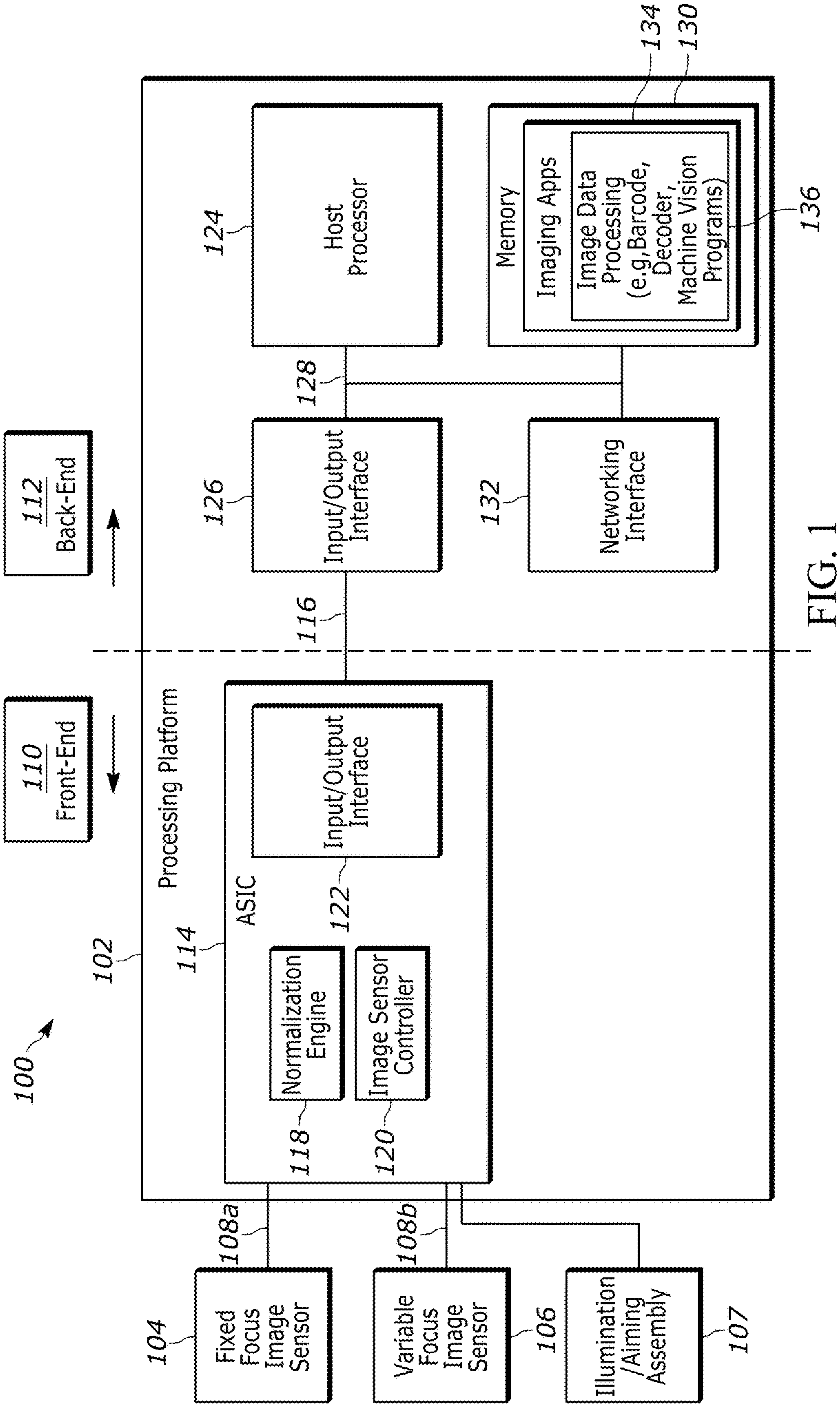
FIG. 1 illustrates a block diagram of an example imaging system configured to analyze an image of a target object to execute a machine vision task and/or perform indicia decoding, in accordance with various embodiments disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Multi-imager systems often struggle from bottlenecked processing pipelines due to multiple images from multiple imagers requiring processing simultaneously. For example, historically, dual sensor frame systems employ a batch processing algorithm wherein a scan engine may provide 3 images at one setting followed by an additional set of 3 or possibly more images at another setting or imaging plane. There is no guarantee that any of the images or settings will provide images that are usable, so the system must wait at least three frame capture times, in addition to however long the processors perform image processing and attempt decoding processes, before additional images may be taken or the system may be reconfigured. This leads to very long processing and decode times that do not ensure a resulting successful scan or decode operation.

Generally, pursuant to these various embodiments, a method and system is provided that may allow for improved image processing, and indicia decode times and efficiencies. In examples, capture images from a multi-imager or multi-camera system may be used and processed in tandem to decrease overall processing times. The various imagers may each be reconfigured between image captures to obtain additional images, while images from other sensors are processed for decoding and machine vision processes. The describe methods may be implemented on any imaging system that employs two imaging sensors or cameras that may be independently controlled, and with pipelines to a processor for performing decoding and machine vision processes.

FIG. 1 illustrates an example block diagram of an imaging device 100 configured to analyze an image of a target object to execute a machine vision task and/or perform indicia decoding, in accordance with various embodiments disclosed herein. The imaging system 100 is configured to capture images of objects and decode indicia in the images. Scanners are frequently used in environments that involve scanning or resolving barcodes across multiple fields of view (FsOV) which may employ multiple cameras or imaging assemblies. The system 100 may be used to perform the frame sequencing optimization, image processing, and fast decoding as described herein.

The imaging device 100 has multiple imagers for enabling efficient, dynamic operation of a host processor to process received images and perform decoding of indicia. In particular, FIG. 1 is a block diagram representative of an example logic circuit configuration for implementing an imaging device, in accordance with various examples herein. The imaging device 100 may be implemented in an example logic circuit capable of executing instructions to, for example, implement operations of the example methods described herein, as may be represented by the flowcharts of the drawings that accompany this description. While various examples are illustrated and described, it will be appreciated that example logic circuits capable of, for example, implementing operations of the example methods described herein may include field programmable gate arrays (FPGAs) and application specific integrated circuits (ASICs). Other example logic circuits include digital signal processors (DSPs), image signal processors (ISPs), and general-purpose CPUs.

The imaging device 100 includes an illumination/aiming assembly 107 to provide illumination to one or more FsOV of the imaging device 100. The illumination/aiming assembly 107 may include one or more sources to provide illumination (e.g., LEDs, laser diodes, black body radiation sources, color light sources, etc.) provide illumination to a portion, or entire FOV, or to provide an aiming pattern. The aiming pattern may be used for a user to identify where to place a target object, or indicia for performing barcode scanning and imaging of objects and indicia in an environment.

The imaging device 100 further includes a processing platform 102 coupled to two image sensors 104 and 106. In examples, the imaging sensors may include a variable focus image sensor 104 and a fixed focus image sensor 106, in electrical communication with the processing platform 102 through respective data channels (e.g., communication buses) 108*a* and 108*b*. The processing platform 102 includes a processing front-end 110 and a processing back-end 112. In various examples, the processing front-end 110 is configured to control operation of the image sensors 104 and 106 to capture single or continuous images over respective fields of view (FOVs) of the image sensors 104 and 106, where such images are captured, stored, and communicated as image data. The image data from the respective image sensors may be captured at different image resolutions, contrast levels, brightnesses, and focus planes. The front-end 110 may be configured to capture raw image data from the image sensors 104, 106, simultaneously or sequentially. The front-end 110 may be configured to capture image data in response to various triggers depending on the configuration, for example, in response to an external event, such as detection of an object entering a FOV of one of the image sensors, a user input, or through other initiating actions. Further, the front-end 110 may be configured to pre-process the captured image data and communicate the pre-processed data to the back-end 112, which may be further configured to identify features of interest or targets in the image data. In particular, the front-end 110 is configured to perform a normalization process on captured image data prior to communicating that image data to the back-end 112 over a communication bus 116.

To affect such pre-processing, in the illustrated example of FIG. 1, the front-end 110 contains an ASIC 114 that includes a normalization engine 118, an image sensor controller 120, and an I/O interface 122 communicatively coupled to the communication bus 116. The back-end 112 includes a host processor 124 that receives the captured image data, such as affected image data from the ASIC 114, over an I/O interface 126, and performs dedicated imaging processing operations on that data, such as object identification, feature identification, indicia identification and decoding, or other processing-intensive operations isolated from the front-end 110, which is to provide a lightweight processing operations. In various examples, the host processor 124 may send control commands to the front-end 110, i.e., the ASIC 114, to control operation of the image sensors 104, 106, from which, in response the ASIC 114 provides the image data to the normalization engine 118 generating affected image data that is then transmitted to the host process 124 for image processing.

As mentioned, in the illustrated example, the variable focus image sensor 104 and the fixed focus image sensor 106 capture image data over different respective fields of view (FOV), e.g., the former capturing over a range of 6 ft, with focal distance capture between 0 and 6 feet from the device, or between 2 and 8 feet, 4 and 10 feet, less than 10 feet, or less than 20 feet from a scanner device and the later capturing over a range of about 100 feet or greater from the scanner device. That is, in some examples, the operative focal ranges of image sensors overlap, while in other examples the focal distances of the image sensors do not overlap. While not required, generally the variable focus image sensor 104 may have a smaller FOV (e.g., 14° FOV), as measured in angle of divergence, compared to a larger FOV (e.g., 40° FOV) of the fixed focus image sensor 106. In such implementations, the variable focus image sensor 104 may be configured to image objects at further distances than the fixed focus image sensor 106. As such, objects, features, barcodes, etc. appear smaller in the far field compared to the near field, and, generally far field image sensor may have or require higher resolution, and thus large image sizes, to perform accurate analysis, machine vision processes, and indicia decoding of the image data when eventually provided to the host processor 124.

The two sensors 104, 106 may be separate structures mounted on the same printed circuit board, or may be separate sensors mounted on separate circuit boards. In other examples, the two sensors 104, 106 may be integrated into a single photodiode array structure, with each sensor partitioned to a different portion of the array structure. In operation, in some examples the image sensor controller 120 controls the sensors 104, 106 to capture image data at the response image sizes at a sample frame rate, e.g., 60 frames per second (fps). In some examples, the respective frame rates of the sensors 104, 106 differ from one another. Further, captured image data from each sensor 104, 106 is sent to the ASIC 114. In some examples, the ASIC 114 buffers the entire capture image data, for example, each frame. In some examples, the ASIC 114 receives the image data using only row buffering, thereby reducing the buffer memory size on the ASIC 114.

The speed of image capture and communication may also be determined by the type of I/O interfaces 122 and 126 and the type of buses 108*a*/108*b* and 116. In various examples, the interfaces 122, 126 are each mobile industry processor interface (MIPI) I/O interfaces, and the buses 108*a*/108*b* and 116 are MIPI buses. Other example bus architectures include parallel bus, serial peripheral interface (SPI), high speed serial peripheral interface (HiSPi), low voltage differential signaling (LVDS), and universal serial bus (USB). In some examples, in addition to the connection between interfaces 122 and 126 for affecting data transfer, the front-end 110 and the back-end 112 may be connected together by control interfaces, such as an $I^2C$ command/control interface or a Camera Control Interface (CCI). As such, in some examples, the interfaces 122 and 126 may represent a control and data interface. Each of the buses 108*a*, 108*b*, and 116 may be a single pipe bus (i.e., a single lane), while in other examples, the buses 108*a*/108B and 116 are dual pipe (i.e., two lane) bus. For MIPI compliant buses and interfaces, a MIPI data rate of 672 Mbps/lane may be used. In some examples, each of the image sensors 104, 106 may use two MIPI lanes (108*a* and 108*b*, respectively) at 8 bits/pixel to transmit the respective image data from the sensor. In such examples, the maximum output data rate to the host processor 124 may be 2*672 Mbps=1344 Mbps. In some examples, the data channels 108*a*, 108*b* have the data throughput rate that is different than the data throughput rate for the data channel between interfaces 122 and 126. In some examples, the channels 108*a* and 108*b* are 1 channel, 2 channel, or 4 channel MIPI data channel, and the data channel 116 is a 2 channel or 4 channel MIPI data channel.

In the example of FIG. 1, the back-end 112 includes a local bus 128 providing bi-directional communications between the host processor 124, the I/O interface 126, a memory 130 and a networking interface 132. More generally, the bus 128 may connect the host processor 124 to various sub-systems of the imaging device 100, including a WiFi transceiver subsystem, a near field communication (NFC) sub-system, a Bluetooth sub-system, a display, series of applications (apps) stored in an app memory sub-system, a power supply providing power to the imaging reader 30, and a microphone and speaker sub-system.

To facilitate decoding the different types of image data captured at the respective image sensors 104, 106, the back-end 112 includes the host processor 124 the memory 130 includes imaging applications 134 that include an image data processing application 136. Executing, the image data processing application 136, the host processor 124 receives the image data from the ASIC 114 and provides that image data to the image data processing app 134, as is, or performs initial processing on the received image data, such as determining if there a tag or other metadata in the image data identifying the image sensor source (104 or 106), identifying a type of normalization process performed on the image data by the normalization engine 118 (as further explained herein), or having data that may be used in image processing.

In various embodiments where the imaging device 100 is a barcode scanner imaging device, the imaging app 134 may include one or more apps to more efficiently identify indicia in the image data and decode that indicia to generate decode data corresponding to the indicia. By contrast, in various embodiments where the imaging device 100 is a machine vision device, the imaging apps 134 may include one or more apps to identify one or more objects in the image data, one or more defects in identified objects, the presence or absence of particular objects in the image data, distances between identified objects in the image data, contrast data, brightness data, pixel count, or a combination thereof.

To affect such processes, in various embodiments, the host processor 124 executes the image data processing app 136 to identify one or more barcodes (or other indicia) in the received image data. For example, the image data processing app 134 may be configured to identify and decode identified indicia, whether the indicia are one-dimensional (1D) or two-dimensional (2D) barcodes, quick response (QR) codes, data matrix codes, linear barcodes, or other encoded indicia. The decoded indicia, such as a barcode, may be indicative of information pertaining to a target object in an obtained image. Further, as a part of image data processing, the app 134 may perform pixel and image smoothing on the image data. Additional processing may include statistical analysis on blocks of image data, such as on the pixel groupings, by performing edge detection identifying indicial or other symbols in the image data, including the bounds of the indicia or symbol and the resolution of the indicia or symbol for sufficiently accurate identification of the indicia and symbol and sufficiently accurate decoding of the indicia or identification of the symbol.

The memory 130 may represent one or more memories and may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., imaging applications 134 (including 136) and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the host processor 124 (e.g., working in connection with the respective operating system in the memory 130) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

The host processor 124 may be connected to the memory 130 through a computer bus, such as bus 128, responsible for transmitting electronic data, data packets, or otherwise electronic signals to and from the host processor 124 and the memory 130 in order to implement or perform the machine readable instructions, methods, processes, elements or limitations, as illustrated, depicted, or described for the various flowcharts, illustrations, diagrams, figures, and/or other disclosure herein. The host processor 124 may interface with the memory 130 via the computer bus 128 to create, read, update, delete, or otherwise access or interact with the data stored in the memory 130 and/or external databases (e.g., a relational database, such as Oracle, DB2, MySQL, or a NoSQL based database, such as MongoDB). The data stored in the memory 130 and/or an external database may include all or part of any of the data or information described herein, including, for example, image data from images captures by the near field image sensor 104 and far field image sensor 106, from the front-end 110, and more specifically from the ASIC 114.

The example processing platform 102 further includes, at the back-end 112, the networking interface 132 to enable communication with other imaging devices (e.g., barcode imaging devices or machine vision devices) via, for example, one or more networks. The example networking interface 132 includes any suitable type of communication interface(s) (e.g., wired and/or wireless interfaces) configured to operate in accordance with any suitable protocol(s) (e.g., Ethernet for wired communications and/or IEEE 802.11 for wireless communications and/or USB3.0). The example processing platform 100 also includes the I/O interface 126, which in some examples represents multiple I/O interfaces, such as a MIPI interface for physically connecting to the front-end 110 through its MIPI I/O interface 122, and another I/O interface to enable receipt of user input and communication of output data to the user, for example, device interfaces may be external I/O interfaces of the back-end 112 to allow for physical connection to external peripherals separate from the connection between I/O interfaces 122 and 126. Such user input and communication may include, for example, any number of keyboards, mice, USB drives, optical drives, screens, touchscreens, etc. The front-end 110 and the back-end 112, which are communicatively coupled, may also be physically, removably coupled to one another via a suitable interface types. The I/O interfaces 122 and 126 may generally be any high-speed data interface, such as MIPI, HiSPi, or LVDS. The I/O interfaces 122 and 126 may be considered to form an image data interface or a frame interface. In some examples, a Camera Serial Interface is used. Furthermore, although shown separately, the interface 126 may be integrated into the host processor 124 or separately connected thereto. For example, the image data from the front-end 110 may be received directly to the interface 126 along with a direct memory access (DMA). Indeed, the memory 130 and/or the networking interface 132 may be integrated into the host processor 124. Thus, in various examples of the back-end 112, there is no local bus 128 or separate I/O interface 126, but rather communication occurs directly to the host processer 124 circuit which provides the functions described through integrated modules.

Figure 2:
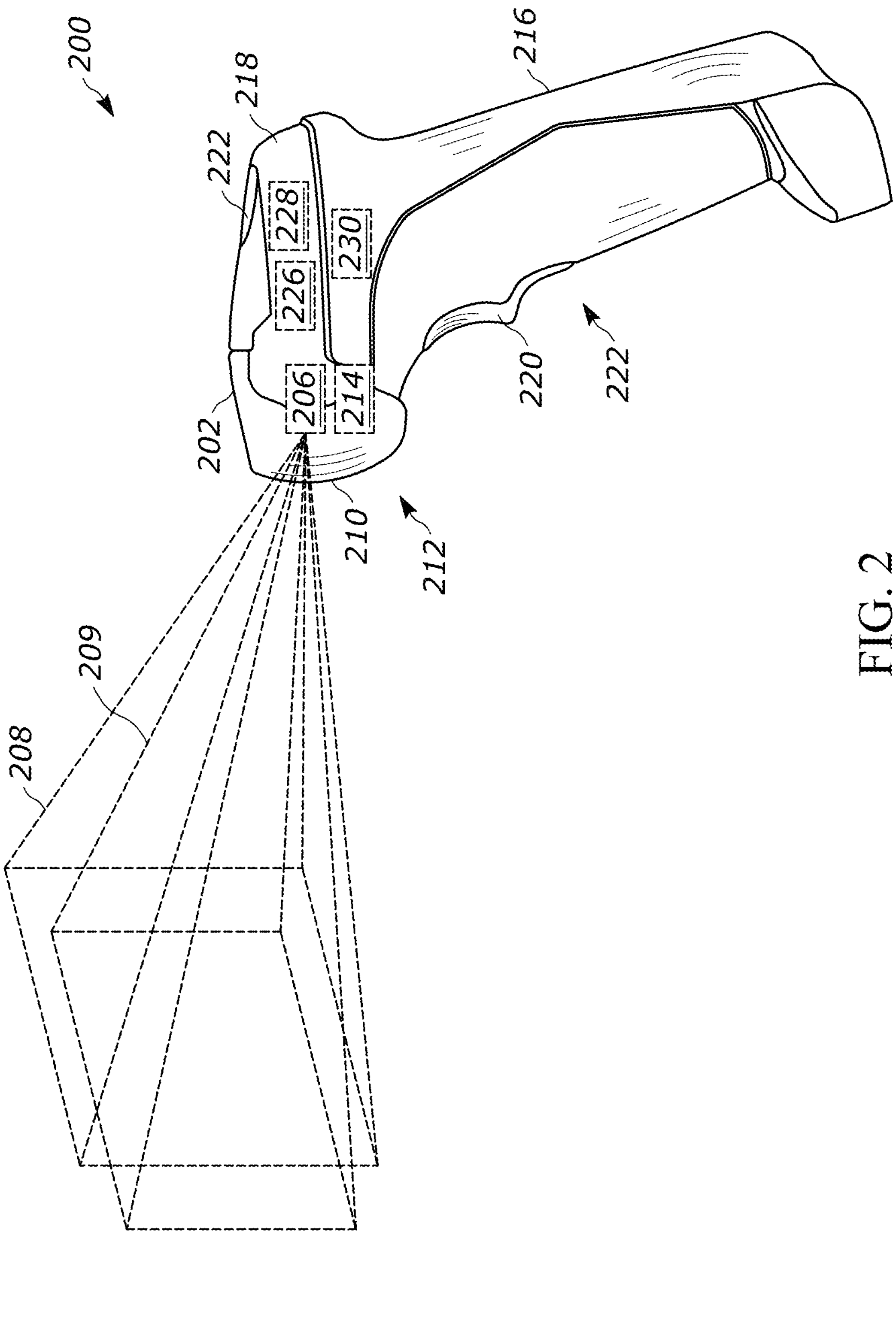
FIG. 2 illustrates an example handheld scanner configured to scan and decode indicia, in accordance with various embodiments disclosed herein.

FIG. 2 illustrates an example handheld scanner 200 configured to, among possibly other things, scan and decode indicia, such as a barcode, direct product marking (DPM), or the like. The example handheld scanner 200 may be one example of the imaging device 100 of FIG. 1 and may include the variable focus image sensor 104, the fixed image sensor 106, or may include both of the sensors 104 and 106 of FIG. 1. The handheld scanner 200 includes an example housing 202 in which one or more image sensor(s) 206, which may include one or more fixed and/or variable focus imaging sensors or cameras, is disposed. The image sensor (s) 206 capture image data representing a target in one or more fields of view (FsOV) 208 and 209 of the handheld scanner 100 that passes through a front-facing opening or window 210 on a front side 212 of the handheld scanner 200. The FsOV may include a variable focus FOV 208 of the variable focus sensor, and a fixed focus FOV 209 of the fixed focus sensor. The variable focus FOV 208 may be configured to image at focal distances close to the handheld scanner 200 than the fixed focus FOV 209. The handheld scanner 200 includes an indicia decoder 214 in communication with the image sensor(s) 206, and configured to receive the image data and decode an indicia captured in the image data.

The example housing 202 of FIG. 2 includes a generally elongated handle or lower handgrip portion 216, and an upper body portion 218 having the front side 212 at which the light-transmissive window or opening 210 is located. The cross-sectional dimensions and overall size of the handgrip portion 216 are such that the handheld scanner 200 can be conveniently held in an operator's hand. The front-facing opening or window 210 is configured to face generally away from a user when the user has the handheld scanner 200 in a handheld position. The portions 216 and 218 may be constructed of a lightweight, resilient, shock-resistant, self-supporting material, such as a synthetic plastic material. The housing 202 may be injection molded, but can also be vacuum-formed or blow-molded to form a thin hollow shell which bounds an interior space whose volume is sufficient to contain the various components of the handheld scanner 200. Although the housing 202 is illustrated as a portable, point-of-transaction, gun-shaped, handheld housing, any other configuration including a hands-free configuration could be used.

A manually actuatable trigger 220 is mounted in a moving relationship on the handgrip portion 216 in a forward facing region 222 of the handgrip portion 216. An operator's finger can be used to actuate (e.g., depress) the trigger 220 once a target falls within an imaging field of view 208 or 209 to cause the image sensor 206 to capture an image of the target.

To provide one or more indications (e.g., steady indication light indicating the handheld scanner 100 is powered on, a blinked indication light indicating an indicia has been decoded, etc.), the handheld scanner 200 includes one or more example indicator windows 222 defined in the housing 202. The indicator window 222 is positioned to face at least one of rearwardly, upwardly, or sidewardly relative to the front-facing window or opening 210, and towards a user such that the indicator window 222 is generally visible to the user while the user has the handheld scanner 200 in the handheld position.

To generate light to be emitted through the indicator window 222 as indication light, the handheld scanner 200 includes one or more light sources (one of which is designated at reference numeral 226) disposed inside the housing 202 and positioned to emit indication light through a respective indicator window 222. The light source(s) 226 may be, or include, one or more light-emitting diodes, a light pipe, etc. To provide different indication lights through the indicator window 222 there may be more than one light source 226 association with the indicator window 222.

The example handheld scanner 200 includes a processor 230 configured to control one or more modes of the handheld scanner 200 and/or a device in communication with the handheld scanner 200 (e.g., a point-of-sale (POS) station, an inventory management system, etc.) in response to the light detector(s) 228 detecting the reflection(s) of emitted indication light. In some examples, the processor 230 controls the imaging parameters and settings of the sensor(s) 106 to obtain images in one or more of the FsOV 208 and 209. Additionally, the processor 230 may perform image processing and execute any routines or machine-executable instructions to perform machine vision processes and indicia decoding as described herein. In examples, the processor 230 may perform the operations of the host processor 124 of FIG. 1, and may access the various apps 134 and 136 of the memory 130.

Figure 3:
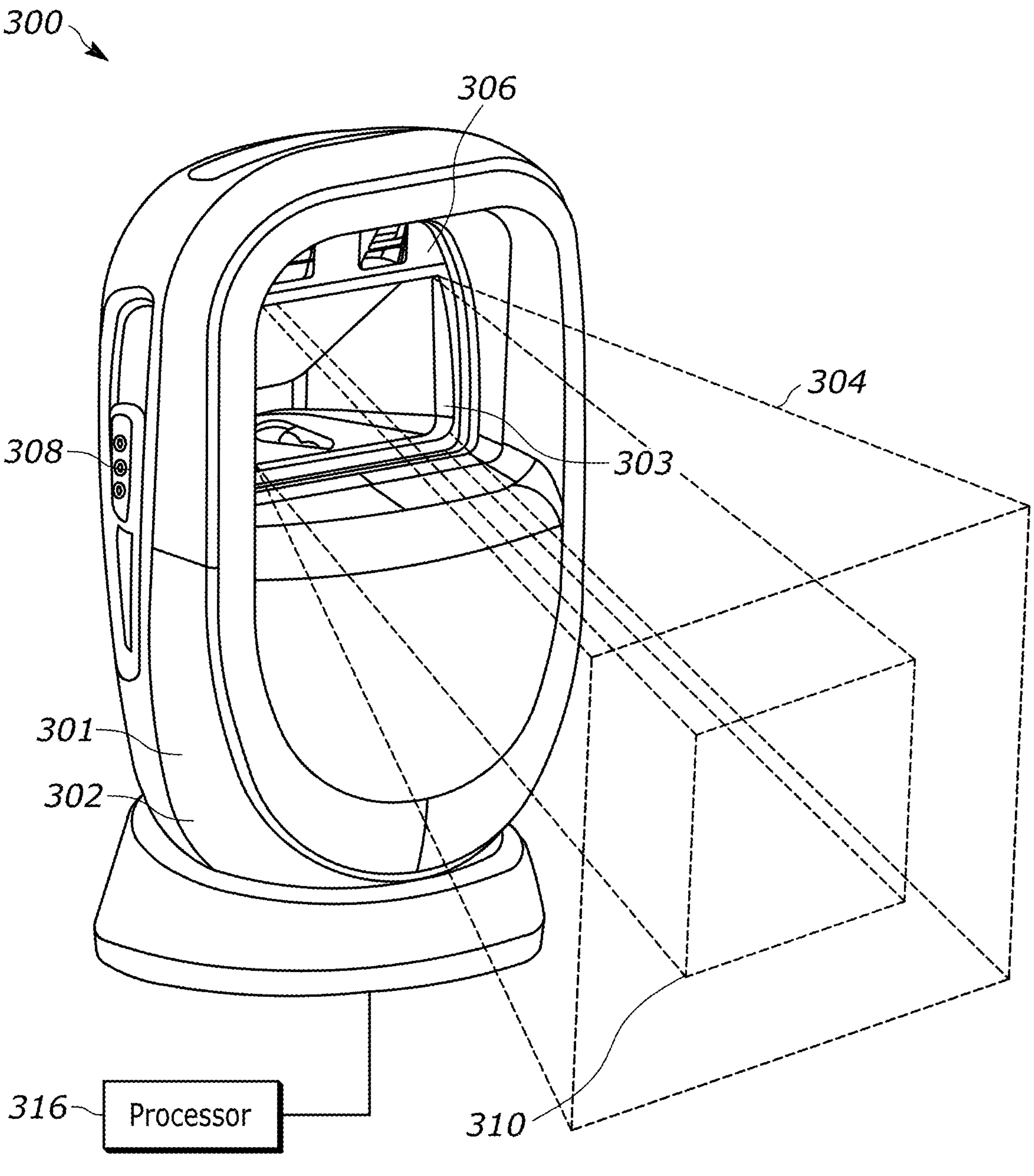
FIG. 3 illustrates a perspective view of another example imaging device as a scanning device, in accordance with various embodiments disclosed herein.

FIG. 3 illustrates a perspective view of another example imaging device as a scanning device 300 in accordance with the teachings of this disclosure. The scanning device 300 may be referred to as an indicia reader, and the scanning device 300 may be handheld to move around a target to scan indicia or the scanning device 300 may be stationary, for example, free standing on a countertop. In the example shown, the scanning device 300 includes a housing 301 having a handle or a lower housing portion 302 and an optical imaging assembly 303. The optical imaging assembly 303 is at least partially positioned within the housing 301 and has a variable focus FOV 304, and a fixed focus FOV 310. The scanning device 300 also includes an optically transmissive window 306 and a trigger 308. The optical imaging assembly 303 may include one or more image sensors that may include a plurality of photo-sensitive elements (e.g., visible photodetectors, infrared photodetectors or cameras, a color sensor or camera, etc.). The photosensitive elements may be arranged in a pattern and may form a substantially flat surface. For example, the photosensitive elements may be arranged in a grid or a series of arrays forming a 2D surface. The image sensor(s) of the optical imaging assembly 303 may have an imaging axis that extends through the window 306. The optical imaging assembly 303 may include one or more of a variable focus imaging sensor or camera, and a fixed focus imaging sensor or camera. Each of the fixed and variable focus imaging sensors may be configured to have near or far field imaging planes as desired or required for specific applications.

To operate the scanning device 300, a user may engage the trigger 308 causing the scanning device 300 to capture an image of a target, a product code, or another object. Alternatively, in some examples, the scanning device 300 may be activated in a presentation mode to capture an image of the target, the barcode, or the other object. In presentation mode, the processor 316 is configured to process the one or more images captured by the optical imaging assembly 303 to identify a presence of a target, initiate an identification session in response to the target being identified, and terminate the identification session in response to a lack of targets in the FOV 304.

Figure 4:
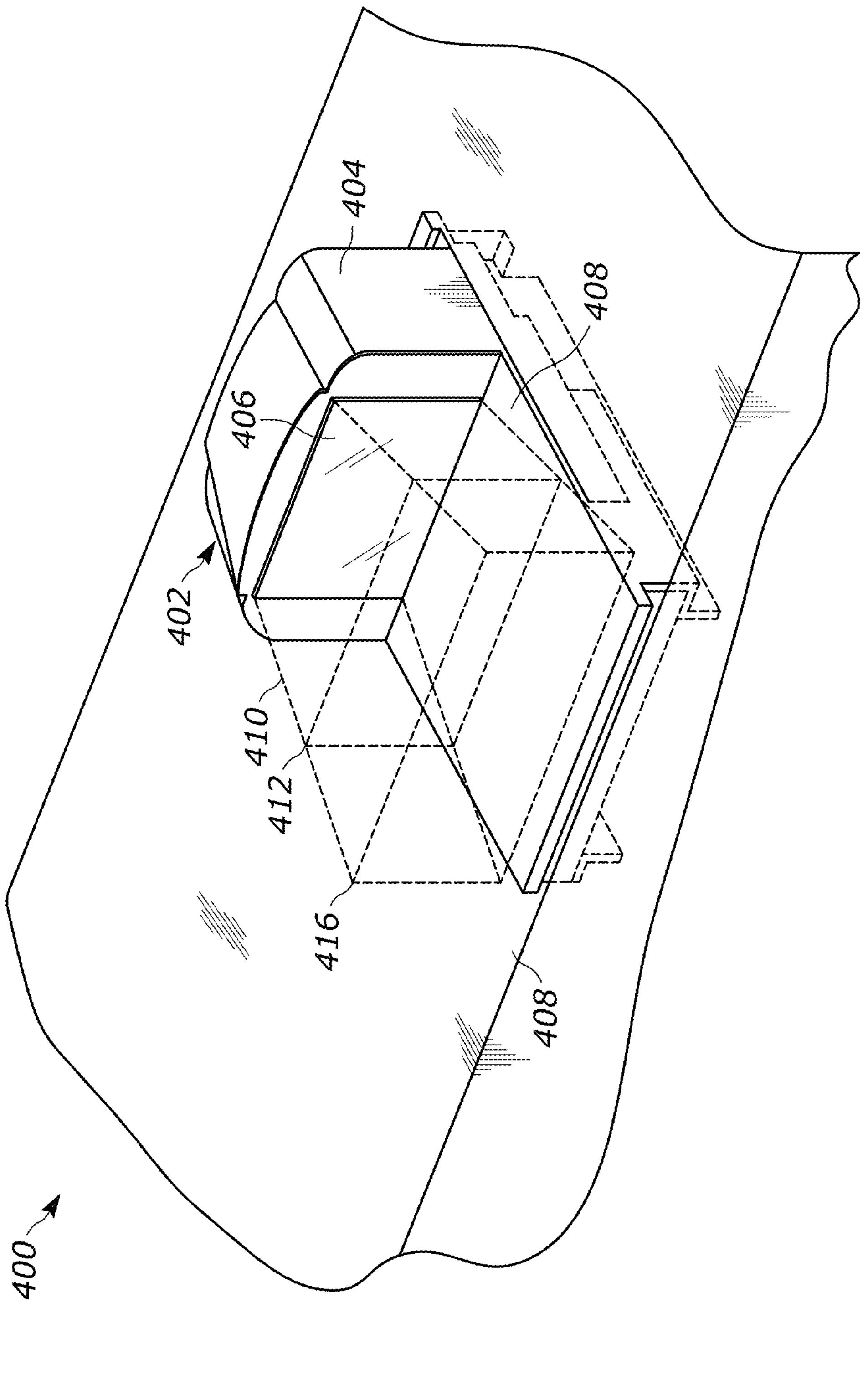
FIG. 4 illustrates an exemplary scanning station having an imaging device, in the form of a bioptic scanner, for performing scanning of indicia and decoding of data, in accordance with the teachings of this disclosure.

FIG. 4 illustrates an exemplary scanning station 400 having an imaging device 402, in the form of a bioptic scanner, having a housing 404 and a first scanning window 406 behind which is an illumination source (not shown) and an imaging stage with a field of view. The imaging reader 402 is positioned adjacent a scanning surface 408 and defines a horizontally and vertically extending working range 410 illuminated by the imaging device 402 and having defined imaging planes 412, and 416 at which the imaging device 402 captures images of an object for performing imaging, and optimized image processing and decoding of indicia in the images, as described herein. The example imaging devices of FIGS. 2-4 are illustrative, and other imaging assemblies and systems may be used for performing the disclosed methods.

Figure 5:
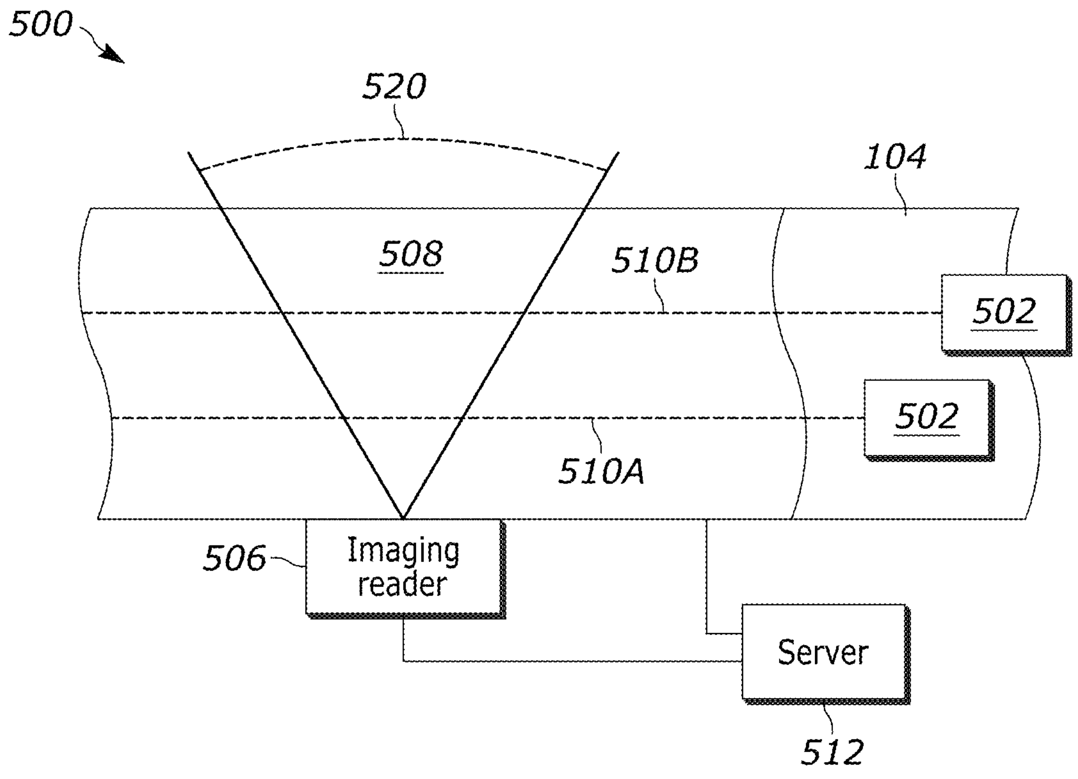
FIG. 5 illustrates an exemplary environment where embodiments of the present invention may be implemented, including the processes described and illustrated herein.

FIG. 5 illustrates an exemplary environment where embodiments of the present invention may be implemented, including the processes described and illustrated herein. In the present example, the environment is provided in the form of a scanning station 500 where goods 502 are moved across or along a scanning surface 504 and are scanned by an imaging reader 506 to identify the goods 502. In some embodiments, the scanning station is a point-of-sale (POS) station, which may have a computer system and an interface, not shown, for optically scanning goods and identifying the goods and characteristics of the goods for affecting a transaction. In some embodiments, the scanning station 500 is part of an inventory delivery system, where goods are conveyed by the scanning surface or across the scanning surface to monitor and control delivery of the goods, for example, shipping goods from a facility or receiving shipped goods to a facility.

The scanning surface 504 may be a stationary surface, such that the goods 502 are manually moved relative to the surface 504. In embodiments, the scanning surface 504 may move the goods 502 or be moved by another automated means. In other embodiments, the scanning surface 504 may be a moving surface, such as by a conveyor system such as a conveyer belt, pneumatic conveyer, wheel conveyer, roller conveyer, chain conveyer, flat conveyer, vertical conveyer, trolley conveyer, or another conveyer. In any case, the goods 502 may be moved continuously relative to the imaging reader 506, such that the goods 502 are constantly moving through a working (or scanning) range 508 of the station 500, within a field of view 520 of the imaging reader 506. In some examples, the goods 502 move in a discretized manner, where, at least part of the time the goods 502 are maintained fixed on the surface 504 relative to the imaging reader 506 for a period of time, sufficient to allow one or more images to be captured of the goods 502.

The goods 502 may move along different substantially linear paths 510A, 510B, etc. each path traversing the working range 508 but at a different distance from, and through the FOV 520 of, the imaging reader 506. Indeed, the paths 510A, 510B are for illustration purposes, as the goods 502 may traverse across the surface 504 at any distance from the imaging reader 506. The imaging reader 506 may employ more than one imaging censor or camera configured to image objects at different focal planes or focal distances. As such, the imaging reader 506 may employ one or more fixed focal distance imaging sensors, or variable focal distance imaging sensors, to optimize the flow of imaging data and perform image processing and indicia decoding as described herein. While, in FIG. 5, the imaging reader 506 is depicted as being to the side of the goods 502, in embodiments, the imaging reader 506 may be positioned directly above the goods 502, above the goods 502 in front of or behind the goods 502 configured to image the object of interest, or at another position for imaging a region of interest of the goods 502 or any object of interest.

Figure 6:
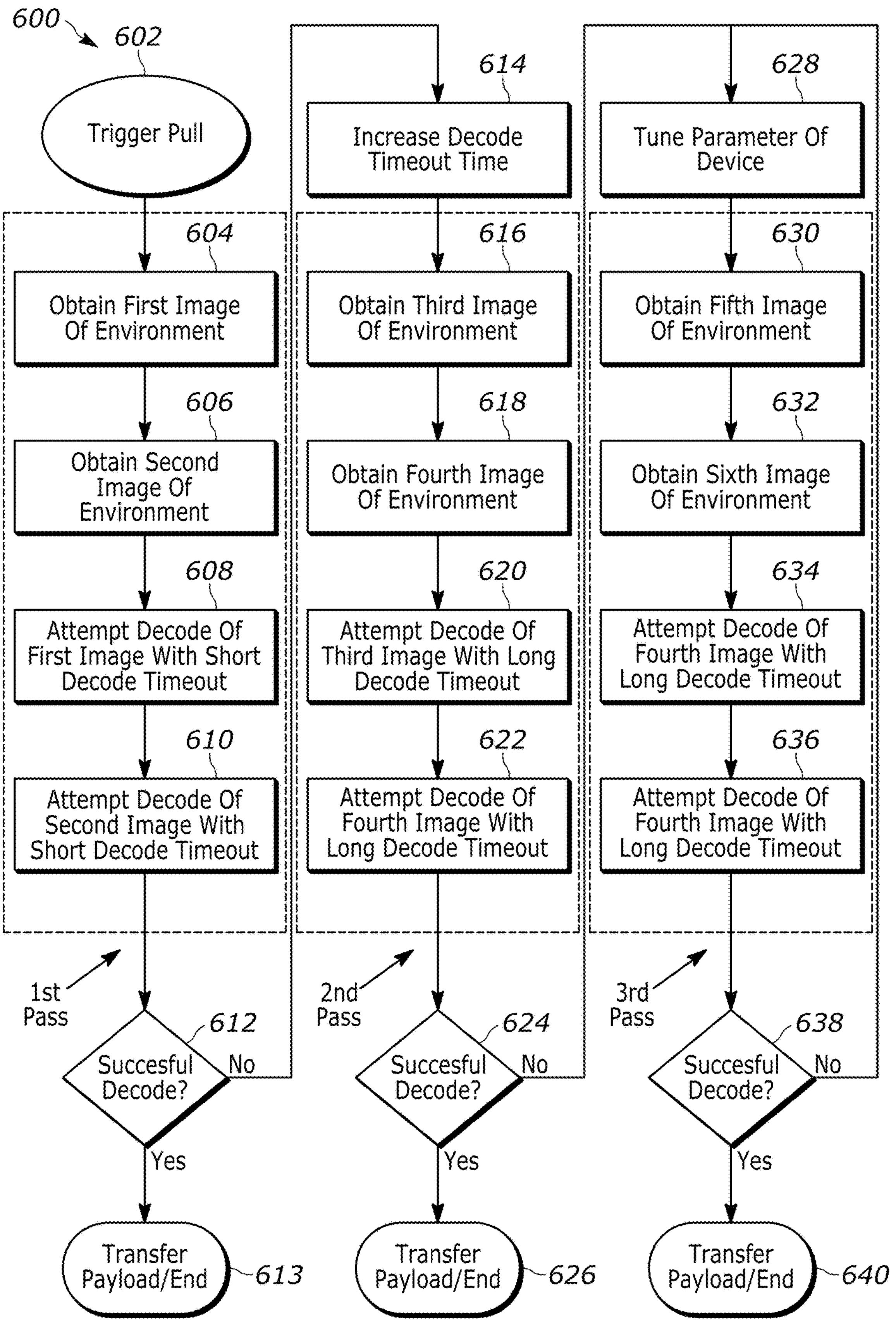
FIG. 6 is a flowchart of a method for performing decoding of encoded data appearing in images, in accordance with the teachings of this disclosure.

FIG. 6 is a flowchart of a method 600 for performing decoding of encoded data appearing in images. Specifically, the method 600 is for decoding of encoded data obtained by one or more cameras or imaging sensors, with the images being of an environment, or objects, in one or more FsOV of the imagers or cameras. The method 600 may be performed by the imaging device of FIG. 1, handheld scanner of FIG. 2, scanning device 300 of FIG. 3, scanning stations 400 or 500 of FIGS. 4 and 5 respectively, or by another imaging device, or scanning system. The method 600 includes performing an initiation of the device via a trigger pull, such as pulling the trigger 220 of FIG. 2, or via pressing a button or other initiation. The initiation may include presenting an object or item into a FOV of the device, and the device detecting the presence of the object and changing modes from a rest or dormant mode, into an active, scanning, or imaging mode. In examples, the initiation may not be required for performing the method 600, and therefore, pulling the trigger or performing a manual initiation may be unnecessary. Further, the method 600 may be initiated via another system, network, or processor via a remote command provided by a user, or provided at specific intervals or at scheduled times.

The method 600 further includes obtaining a first image of an environment at 604. The first image may be captured by an imaging assembly including an imaging device such as a camera or imaging sensor. The imaging assembly captures an image of a FOV including one or more targets, or objects of interest, being disposed in the FOV of the imaging device. In examples, the imaging system may include one or more of an infrared camera, a color camera, two-dimensional camera, a three-dimensional camera, a handheld camera, a fixed focal distance camera, a variable focus camera, or a plurality of cameras. The first image may be obtained via a first imaging device such as a first camera that is configured to have a fixed or variable focal distance. In examples, the first imaging device is a fixed focus camera, and the first imaging device captures the image at a first focal distance of the imaging assembly.

The imaging assembly then captures a second image of the FOV of an environment including one or more objects of interest at 606. The second image may be obtained by a second imaging device such as a second camera, imaging sensor, or other image capture device of the imaging assembly. The second imaging device captures the second image at a second focal distance or focus that is different than the first focal distance. The second imaging device may include a variable focus camera, and the second focal distance may be one focal distance of a range of possible focal distances that may be captured in images by the second imaging device. In examples where the second imaging device includes a variable focus camera, or variable focus element, the method 600 may further include performing an autotune of the focus of the second imaging device before obtaining the second image. The autotune function may be performed while the first imaging device captures the first image to perform operations in parallel to increase the overall efficiency of performing the method 600. In examples, the second imaging device may include one or more of an infrared camera, a color camera, two-dimensional camera, a three-dimensional camera, a handheld camera, a fixed focal distance camera, a variable focus camera, or a plurality of cameras.

The imaging assembly passes data indicative of the first image to a decoder, and the decoder attempts to perform a first decode operation at block 608. The first decode process may include identifying one or more indicia in the first image and decoder the indicia to determine a payload associated with the indicia. The indicia may include one or more of a one-dimensional (1D) or two-dimensional (2D) barcodes, quick response (QR) codes, data matrix codes, linear barcodes, alphanumeric, data matrix, static barcode, dynamic code, or other encoded indicia. The decoder may be a dedicated device, processor, or hardware, or may be implemented via one or more processors as a software or application., For example, the decoder may be implemented as the image data processing app 134 that identifies and decodes barcodes and other indicia. Passing the image data of the first image to the decoder may be performed in parallel with additional images being obtained by the first image device, and/or while the second image, and additional images, are obtained by the second imaging device of the imaging assembly. Therefore, passing the data and decoding of indicia of the first image may be performed in parallel to other operations to improve the efficiency of performing indicia decoding according to the described methods.

The decoder may successfully identify and decode indicia in the first image, or the decoder may perform an unsuccessful decode operation. In examples, the decoder may perform multiple attempts to identify and decode indicia in the first image. Performing additional image processing for identifying indicia, or performing error checking and correction takes additional time and may not result in a successful decode. As such, the first decode operation may have a decode timeout time that limits the amount of time the decoder is allotted to attempt a decode operation. In the provided examples, the first decode operation has a first decode timeout time. The first decode timeout time is considered to be shorter than decode timeout times of subsequent iterations of the method, as will be described further herein. The first decode timeout time may be dependent on a frame rate of one or more image devices of the imaging assembly, or may be dependent on specific processing and imaging capabilities of a given system. In specific examples, the first decode timeout time may be 5 ms, 10 ms, 15 ms, 20 ms, 25 ms, between 10 and 20 ms, between 15 and 25 ms, between 10 and 30 ms, less than 20 ms, less than 25 ms, less than 30 ms, or less than 50 ms. In any examples herein, the first decode timeout time may be considered to be a shorter timeout time relative to subsequent decode timeout times.

The imaging assembly further passes data indicative of the second image to the decoder, and the decoder attempts to perform a second decode process on the second image at block 610. The second decode process may include identifying one or more indicia in the second image and decode the indicia to determine a payload associated with the indicia. The indicia may include one or more of a one-dimensional (1D) or two-dimensional (2D) barcodes, quick response (QR) codes, data matrix codes, linear barcodes, alphanumeric, data matrix, static barcode, dynamic code, or other encoded indicia. Passing the image data indicative of the second image to the decoder may be performed in parallel with additional images being obtained by the first imaging device, and/or while the second image, and additional images, are obtained by the second imaging device of the imaging assembly. Therefore, passing the data and decoding of indicia of the second image may be performed in parallel to other operations to improve the efficiency of performing indicia decoding according to the described methods.

The decoder may successfully identify and decode indicia in the second image, or the decoder may perform an unsuccessful decode operation. In examples, the decoder may perform multiple attempts to identify and decode indicia in the first image. Performing additional image processing for identifying indicia, or performing error checking and correction takes additional time and may not result in a successful decode. As such, the second decode operation may have a decode timeout time that limits the amount of time the decoder is allotted to attempt a decode operation. In the provided examples, the second decode operation has the same first decode timeout time as the first decode operation.

As previously described, the first decode timeout time is considered to be shorter than decode timeout times of subsequent iterations of the method, as described further herein.

The method 600 further includes, at block 612, determining if a successful decode operation has been performed from decoding indicia in either of the first or second images, or if the first and second decode operations have been unsuccessful for both the first and second images. If at least one of the first or second decode operations successfully decoded indicia, then the device may access the identified payload, and transfer the payload and any additional decoded information or data to another system for further processing at 613. In response to both the first and second decode operations being unsuccessful, the method 600 further includes performing additional decode operations with an increased decode timeout time.

As described herein, obtaining the first and second images and attempting decoding of indicia in the first and second images (e.g., blocks 604, 606, 608, and 610) may be considered as a first "pass" of the method 600. If a successful decoding of indicia occurs in the first pass, then the method 600 concludes and ends at 613, and a new session or instance of the method 600 may be initiated. If both the first and second decode processes are determined to be unsuccessful, the method 600 includes increasing the decode timeout time 614, and performing a second pass.

The second pass may include obtaining a third image via the first imaging device at 614. The third image may be captured at a same focal distance as the first image in examples with the first imaging device having a fixed focal length. The second imaging device further obtains a fourth image at 616. The imaging assembly then passes the data indicative of the third image to the decoder and the decoder attempts a third decode operation at 620. The imaging assembly passes the fourth image to the decoder and the decoder attempts to perform a fourth decode operation on the fourth image at 622. The third and fourth decode operations are each performed with a second decode timeout time that is longer than the first decode timeout time of the first pass. The second decode timeout time may be two times longer, 4 times longer, or another multiple or timeout time based on the duration of the first decode timeout time. In other examples, the second, longer, decode timeout time may be about 30 ms, 40 ms, 50 ms, 75 ms, 100 ms, 150 ms, 200 ms, between 20 and 50 ms, between 30 and 60 ms, between 50 and 100 ms, between 100 and 200 ms, greater than 25 ms, greater than 50 ms, or greater than 100 ms. The longer duration of the second decode timeout time allows for the decoder to perform addition operations such as image processing (e.g., adjusting brightness, sharpness, skew, more complex indicia identification algorithms, more complex error corrections, etc.) than are allowed in the first pass. As such, the decoder may be able to identify and decode indicia in the third image with the only difference between the first and second passes being the extended decode timeout time. Additionally, while described and illustrated as performing the third and fourth decode operations on obtained third and fourth images, it should be understood that the method 600 may perform the third and fourth decode operations on the obtained first and second images, and that the extended second decode timeout time may be sufficient to perform a successful decode on one of the first or second images where the shorter first decode timeout time was not enough time to perform a successful decode operation on either of the first or second images.

At 624 the method 600 includes determining if either of the third or fourth decode operations were successful. If either of the third or fourth decode operations were successful then the payload is identified and may be further processed or provided to additional systems or networks, and the method 600 may conclude. Conversely, if neither of the third or fourth decode operations are successful, then the method 600 includes tuning one or more parameters of the system or device and performs at least one additional subsequent pass.

A processor or external network or system may tune one or more parameters of the device at 628. In examples, tuning the one or more parameters may include tuning a parameter of an imaging device (e.g., image sensor gain, image capture frame rate, exposure time, focal distance, etc.), illumination assembly (e.g., brightness, illumination color, illumination duration, etc.), image processing (e.g., amount of sharpening, skew, image filtering, geometric transformations, etc.), or another parameter of the device. In specific examples, tuning the one or more parameters may include tuning or calibrating a focus of one or more imaging devices of the imaging assembly. For example, the second imaging device may be a variable focus camera and tuning the one or more parameters may include performing a focus ramping, focus dither, or focus bracketing to obtained multiple images and to adjust the focus of the imaging device. In some implementations, an aiming pattern may be provided via an illumination or aiming assembly, and the aiming pattern may be used to further tune the focus of the second imaging device. For example, a ranging measurement may be performed using an aiming pattern in the FOV of the second imaging device, and a focal distance may be determined from the ranging measurement.

Once the one or more device parameters are tuned, the first imaging device obtained a fifth image of the environment in the FOV of the first imaging device at 628, and the second imaging device captures a sixth image of the environment in the FOV of the second imaging device at 630. The fifth image may be obtained at the fixed focal distance of the first imaging device, while the sixth image may be captured at a different, tuned focal distance of the second imaging device. The imaging assembly then passes data indicative of the fifth and sixth images to the decoder to attempt respective fifth and sixth decode operations on the fifth and sixth images at 634 and 636. The fifth and sixth decode operations are performed with the second decode timeout time (e.g., the extended decode timeout time). In examples, tuning the parameter of the device may further include tuning the decode timeout time further to increase or decrease the decode timeout out. As such, the fifth and sixth decode operations may be performed with decode timeout durations shorter or longer than the second decode timeout time.

At 638 the method 600 includes determining if either of the fifth or sixth decode operations were successful. If either of the fifth or sixth decode operations were successful then the payload is identified and may be further processed or provided to additional systems or networks, and the method 600 may conclude at 640. Conversely, if neither of the fifth or sixth decode operations are successful, then the method 600 returns to block 628, performs another iteration of tuning one or more parameters of the system or device, and performs at least one additional subsequent pass of obtaining images and attempting decode operations of the obtained images at tuned or adjusted device parameters.

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

We claim:

1. A method for decoding encoded data appearing within a field of view (FOV) of an indicia reader, the method comprising:

obtaining, via an imaging assembly, a first image of the FOV of an environment, the first image obtained with the imaging assembly having a focus at a first focal plane distance;

obtaining, via the imaging assembly, a second image of the FOV of the environment, the second image obtained with the imaging assembly having a focus at a second focal plane distance;

passing the first image to a decoder and attempting, by the decoder, a first decode operation on the first image to determine a payload, the first decode operation having a first decode timeout time;

passing the second image to the decoder and attempting, by the decoder, a second decode operation on the second image to determine a payload, the second decode operation having the first decode timeout time;

responsive to performing a successful decode operation from one of the first and second images, transmitting a decoded payload to a host, or responsive to performing unsuccessful decode operations on the first image and second image further performing additional decode operations having a second decode timeout time, with the second decode timeout time being longer than the first decode timeout time.

2. The method of claim 1, wherein responsive to performing unsuccessful decode operations of the first image and second image the method further comprises:

obtaining, via the imaging assembly, a third image of the FOV of the environment, the third image obtained with the imaging assembly having a focus at the first focal distance;

obtaining, via the imaging assembly, a fourth image of the FOV of the environment, the fourth image obtained with the imaging assembly having a focus as the second focal distance;

passing the third image to the decoder and attempting, by the decoder, a third decode operation on the third image to determine a payload, the third decode operation having the second decode timeout time;

passing the fourth image to the decoder and attempting, by the decoder, a fourth decode operation on the fourth image to determine a payload, the fourth decode operation having the second decode timeout time; and responsive to performing a successful decode operation from one of the third and fourth images, transmitting a decoded payload to a host, or responsive to performing unsuccessful decode operations on the third image and fourth image, further tuning one or more parameters of the indicia reader, obtaining, by the imaging assembly, one or more additional images, and performing additional decode operations on the one or more additional images.

3. The method of claim 2, wherein tuning the one or more parameters of the indicia reader comprises performing at least one of a focus ramping, a focus dither, and a focus bracket on one or more imagers of the imaging assembly.

4. The method of claim 2, wherein tuning one or more parameters of the indicia reader comprises tuning one or more of an illumination brightness, image sensor gain, an image capture frame rate, and exposure.

5. The method of claim 1, wherein at least one of the first timeout time and second timeout time is dependent on a frame rate of a respective imaging sensor of the imaging assembly.

6. The method of claim 1, wherein responsive to performing unsuccessful decode operations on the first image and second image, the method further comprises tuning one or more parameters of the system before performing the one or more additional decode operations.

7. The method of claim 1, wherein the first image is obtained via a first imaging sensor of the imaging assembly, the first imaging sensor having a fixed focal distance.

8. The method of claim 1, wherein the second image is obtained via a second imaging sensor of the imaging assembly, the second imaging sensor being a variable focus imaging sensor.

9. The method of claim 8, further comprising performing, via an aiming assembly, a ranging measurement and tuning, based on the ranging measurement, the focus of the second imaging sensor.

10. The method of claim 1, further comprising performing an autotune of one or more imaging sensors of the imaging assembly.

11. A data capture device comprising:

an imaging assembly having (i) a first imaging sensor configured to capture images of a field of view (FOV), and at a first focal distance, of the imaging assembly, and (ii) a second imaging sensor configured to capture images of the FOV, at a second focal distance, of the imaging assembly;

one or more processors and machine readable instructions that when executed by the one or more processors cause the device to:

obtain, via an imaging assembly, a first image of the FOV of an environment, the first image obtained with the imaging assembly having a focus at a first focal plane distance;

obtain, via the imaging assembly, a second image of the FOV of the environment, the second image obtained with the imaging assembly having a focus at a second focal plane distance;

pass the first image to a decoder and attempting, by the decoder, a first decode operation on the first image to determine a payload, the first decode operation having a first decode timeout time;

pass the second image to the decoder and attempt, by the decoder, a second decode operation on the second image to determine a payload, the second decode operation having the first decode timeout time; and responsive to performing a successful decode operation from one of the first and second images, transmit a decoded payload to a host, or responsive to performing unsuccessful decode operations on the first image and second image further perform additional decode operations having a second decode timeout time, with the second decode timeout time being longer than the first decode timeout time.

12. The method of claim 1, wherein responsive to performing unsuccessful decode operations of the first image and second image the wherein the machine-readable instructions further cause the device to:

obtain, via the imaging assembly, a third image of the FOV of the environment, the third image obtained with the imaging assembly having a focus at the first focal distance;

obtain, via the imaging assembly, a fourth image of the FOV of the environment, the fourth image obtained with the imaging assembly having a focus as the second focal distance;

pass the third image to the decoder and attempt, by the decoder, a third decode operation on the third image to determine a payload, the third decode operation having the second decode timeout time;

pass the fourth image to the decoder and attempt, by the decoder, a fourth decode operation on the fourth image to determine a payload, the fourth decode operation having the second decode timeout time; and responsive to performing a successful decode operation from one of the third and fourth images, transmit a decoded payload to a host, or responsive to performing unsuccessful decode operations on the third image and fourth image, further tune one or more parameters of the data capture device, obtaining, by the imaging assembly, one or more additional images, and performing additional decode operations on the one or more additional images.

13. The method of claim 12, wherein to tune the one or more parameters of the data capture device, the machine-readable instructions cause the device to perform at least one of a focus ramping, a focus dither, and a focus bracket on one or more imagers of the imaging assembly.

14. The method of claim 12, wherein to tune one or more parameters of the data capture device, the machine-readable instructions cause the device to tune one or more of an illumination brightness, image sensor gain, an image capture frame rate, and exposure.

15. The device of claim 11, wherein at least one of the first timeout time and second timeout time is dependent on a frame rate of a respective imaging sensor of the imaging assembly.

16. The device of claim 11, wherein responsive to performing unsuccessful decode operations on the first image and second image, the machine readable instructions cause the device to tune one or more parameters of the data capture device before performing the one or more additional decode operations.

17. The device of claim 11, wherein the first image is obtained via a first imaging sensor of the imaging assembly, the first imaging sensor having a fixed focal distance.

18. The device of claim 11, wherein the second image is obtained via a second imaging sensor of the imaging assembly, the second imaging sensor being a variable focus imaging sensor.

19. The device of claim 18, wherein the machine readable instructions further cause the device to perform, via an aiming assembly, a ranging measurement and tune, based on the ranging measurement, the focus of the second imaging sensor.

20. The device of claim 11, wherein the machine readable instructions further cause the device to perform an autotune of one or more imaging sensors of the imaging assembly.

* * * * *